United States Patent Office 3,163,516
Patented Dec. 29, 1964

3,163,516
METHOD OF CONTROLLING JOHNSON GRASS IN SUGARCANE
Edward D. Weil, Lewiston, N.Y., and John P. Stanford, Jackson, Miss., assignors to Hooker Chemical Corporation, Niagara Falls, N.Y., a corporation of New York
No Drawing. Filed Dec. 7, 1959, Ser. No. 857,525
1 Claim. (Cl. 71—2.6)

This invention relates to a process for the selective control of weeds in sugarcane.

Sugar cane is a perennial monocotyledonous plant of major economic importance. Weed control in sugar cane in the United States and in other major sugar growing regions presents unusual problems not encountered with most other crops, namely (a) the period between layby (last cultivation) and harvesting is unusually long, commonly about one half year, (b) the stubble is frequently left to regrow for the next year's crop "ratoon cane") in preference to annual replanting, (c) planting may be done in the fall, allowing a root system to develop over the winter followed by a spring plowing (which does not prevent the root system from developing shoots). The noxious weeds most common in sugarcane are monocotyledonous species, such as Johnson grass, Bermuda grass, and crabgrass. Therefore, the botanical differences between the major weeds and the crop are not large. Broadleaf weeds (dicotyledonous species) also occur in sugarcane and must be controlled.

Largely because of the year-by-year build-up of the perennial grass weeds (particularly Johnson grass) in ratoon cane, the cane cannot be continuously cropped in a perennial fashion. It can usually be cropped for only two or three years in succession, after which the field must be "fallowed" for one growing season, i.e. left idle and repeatedly plowed to exhaust the perennial grass root system. The fallowed field is then replanted, usually in the fall after a summer of fallowing.

The requirements for weed control by chemical means are therefore extremely stringent: (a) the treatment must discriminate selectively between the monocotyledonous weeds and the monocotyledonous crop, i.e. it must control grasses without crop damage, (b) the treatment must also control broadleaf weeds, (c) the treatment must give persistent control, (d) the treatment must not inhibit regrowth of "ratoon cane" from the stubble, and (e) the cost of labor and materials must be low, which implies the desirability of a single treatment rather than a series of treatments.

We have now found that the application of 2,3,6-trichlorophenylacetic acid and certain of its derivatives to the area used for the growing of sugar cane gives selective weed control without crop injury and with ample persistence.

The method of the invention may be practiced using 2,3,6-trichlorophenylacetic acid itself, a salt of this acid, the amide, or an ester of this acid with an alcohol. For economic reasons, the use of the salts of this acid with sodium, potassium, ammonium, or lower alkylammonium, or the amide of this acid are preferred. It is the practice in the herbicide field to consider herbicidal acids and their water soluble salts to be practical equivalents, and, indeed, the recommended rates for a herbicidal salt are customarily given in terms of the equivalent acid. This custom will be followed hereinafter.

The active ingredients required for the practice of our invention are prepared as described in our copending application S.N. 692,046, now abandoned. In practicing the invention, it is not necessary to use the isomerically pure compounds; mixtures containing relatively inactive by-product isomers may be employed. All rates given hereinafter are, however, in terms of the pure 2,3,6-trichloroacetic acid isomer itself.

The method of the invention comprises applying the herbicidal compound to the soil at or before layby, at rates of one-half to twenty pounds per acre. The exact rate to be used will of course depend on soil type, weather conditions, and like factors. Particularly, if the weed population predominates in broadleaf species the lower rates are adequate, if on the other hand, the population consists mainly of the more resistant grasses such as Bermuda grass, the higher rates will be preferred.

The method of the invention can be practiced by applying the given chemical in the pure form, in water solution in the case of the salts, in an emulsion of an organic solvent in water, or in an organic solvent alone. Also, the compound may be applied on a solid carrier, such as clay, limestone, carbon, or the like which may be granular or may be powdered. In the latter case, the powder may be used as such or suspended in water. Formulation adjuvants, as is customary in the pesticide art, may be employed; these include surfactants, dispersants, sticking agents, sequestering agents, and the like.

The compositions employed in the method of the invention may advantageously contain other herbicides, having specific complementary, supplementary, or synergising action on the 2,3,6-trichlorophenylacetic acid or derivative thereof. Such herbicides include sodium trichloroacetate, sodium dichloropropionate, 2,4-dichlorophenoxyacetic acid or salts or esters thereof, 2-methyl-4-chlorophenoxyacetic acid or salts or esters thereof, or 1,1-dimethyl-3-(m-chlorophenyl) urea, for example.

*Example 1*

At layby, a field of Louisiana sugarcane infested with Bermuda grass, crabgrass, and broadleaf weeds was sprayed with a water-solution of the sodium salt of 2,3,6-trichlorophenylacetic acid at the rates of 6, 12, and 18 pounds of equivalent acid per acre. Six months later, the cane was harvested, and regrowth of healthy young plants from the stubble was observed. In the entire intervening period, complete control of weedy grasses and broadleaf weeds was observed at the 4 pound/acre, 6 pound/acre rate. At the 2 pound/acre rate, control of broadleaf weeds was complete, but in the sixth month some regrowth of Bermuda grass occurred; nonetheless the overall weed control at this rate was adequate. A control area wherein the chemical was not applied had a vigorous stand of grassy and broadleaf weeds.

Similar results in a companion series of tests were obtained using the amide and the butoxyethyl ester of 2,3,6-trichlorophenylacetic acid.

*Example 2*

A field infested with Johnson grass and broadleaf weeds was summer-fallowed and then was planted to sugarcane in early autumn and sprayed immediately with a water solution of sodium 2,3,6-trichlorophenylacetate at the rates of 2, 4, and 6 pounds per acre. In the following spring, complete control of Johnson grass and broadleaf seedlings was observed. A control area which had been summer-fallowed but which had not been treated with the chemical bore a dense stand of Johnson grass seedlings and broadleaf seedlings in the following spring. No cane damage was observed.

*Example 3*

A field infested with crabgrass, Johnson grass, barnyard grass, nutgrass, and broadleaf weeds was summer-fallowed and planted to cane in the fall, then plowed in early spring, and 2,3,6-trichlorophenylacetic acid then was applied to the soil surface at the rates of 2 and 3 pounds per acre. At the 3 pound rate, essentially complete control of the seedlings of the above-listed weeds was observed through the growing season. At the 2 pound rate, good, but not complete, control was obtained. A control area was heavily infested with the seedlings of the above-named weeds.

We claim:

The method of controlling Johnson grass in sugarcane comprising applying to the locus to be treated one-half to twenty pounds per acre of a compound selected from the group consisting of 2,3,6-trichlorophenylacetic acid, its sodium salt, amide and butoxyethyl ester.

References Cited in the file of this patent

UNITED STATES PATENTS

| | | |
|---|---|---|
| 2,394,916 | Jones | Feb. 12, 1946 |
| 2,444,905 | Sexton | July 13, 1948 |
| 2,977,212 | Tischler | Mar. 28, 1961 |

OTHER REFERENCES

"Proceedings, Northeastern Weed Control Conference," January 1959, pages 149 to 151 incl., 423 to 429 incl. and 441 to 443 incl.